United States Patent
Ziegler et al.

(10) Patent No.: US 7,051,099 B2
(45) Date of Patent: May 23, 2006

(54) ISDN DISCONNECT ALARM GENERATION TOOL FOR USE IN VOICE OVER IP (VOIP) NETWORKS

(75) Inventors: Fred R. Ziegler, West Medford, MA (US); Sol Farber, Newton, MA (US)

(73) Assignee: Level 3 Communications, Inc., Broomfield, CO (US)

( * ) Notice: Subject to any disclaimer, the term of this patent is extended or adjusted under 35 U.S.C. 154(b) by 854 days.

(21) Appl. No.: 09/870,228

(22) Filed: May 31, 2001

(65) Prior Publication Data

US 2003/0023714 A1    Jan. 30, 2003

(51) Int. Cl.
*G06F 15/173* (2006.01)

(52) U.S. Cl. .............. 709/224; 714/47; 714/48
(58) Field of Classification Search ........... 709/224, 709/223; 714/47, 48; 379/29.1, 266.1, 113, 379/133; 370/352, 353, 435, 354, 238, 230
See application file for complete search history.

(56) References Cited

U.S. PATENT DOCUMENTS

| | | | |
|---|---|---|---|
| 5,940,480 A * | 8/1999 | Jeon et al. | 379/112.03 |
| 5,999,604 A * | 12/1999 | Walter | 379/133 |
| 6,282,192 B1 * | 8/2001 | Murphy et al. | 370/352 |
| 6,553,515 B1 * | 4/2003 | Gross et al. | 709/224 |
| 6,781,959 B1 * | 8/2004 | Garakani et al. | 709/224 |

OTHER PUBLICATIONS

Encyclopedia, Q.931 Protocol Overview, http://www.freesoft.org, pp. 1-7.*

* cited by examiner

*Primary Examiner*—Jeffrey Pwu
(74) *Attorney, Agent, or Firm*—Faegre & Benson LLP

(57) ABSTRACT

An alarm generation tool that operates within a Voice over IP (VoIP) network environment to generate alarms based on ISDN disconnect cause codes. The tool examines call-specific usage records associated with VoIP traffic to detect ISDN disconnect cause codes and determines failure rate information from failure-type disconnect cause codes among the ISDN disconnect cause codes on a per-gateway basis. The tool generates alarms when the failure rate information, such as failure rates and/or counts, exceeds defined thresholds.

12 Claims, 5 Drawing Sheets

```
*****   ISDN DISCONNECT FAILURE ALERT!!! *****
*****   FOUND 2 GATEWAYS *****
*****   ISDN FAILURE RATE > 5% *****
*****   ISDN FAILURE COUNT > 100!!! *****
*****   SEE THE ENCLOSED FILE FOR MORE INFORMATION. *****
DATA PROCESSED ON SUN NOV 26 21:50:54 2000
```

112 {above alert block}

```
####################################################
              ISDN FAILURE RATES
IP ADDRESS       FAILURE RATE (%)      FAILURE COUNT
 4.2.40.98            63.01                 109
 4.2.46.225           51.87                 194
####################################################
```

114

```
              ISDN FAILURE CODES
DATE          GATEWAY        DIS. CODE      COUNT
26-NOV-00     4.2.40.98          1           107
26-NOV-00     4.2.40.98        127             2
26-NOV-00     4.2.40.98         16            63
26-NOV-00     4.2.40.98         17             1
26-NOV-00     4.2.46.225         1           192
26-NOV-00     4.2.46.225       127             1
26-NOV-00     4.2.46.225        16           164
26-NOV-00     4.2.46.225        17            15
26-NOV-00     4.2.46.225        41             1
27-NOV-00     4.2.46.225        16             1
####################################################
```

ISDN DISCONNECT ALARM GENERATION TOOL FOR USE IN VOICE OVER IP (VOIP) NETWORKS

BACKGROUND OF THE INVENTION

The invention relates generally to network fault management and, in particular, to fault management in a Voice over IP (VoIP) network.

Traditionally, operators of both telephony and data networks have used network management systems to collect, process and analyze fault data indicating network equipment malfunctions to mitigate the impact of such malfunctions on customer service. Typically, the processing of large volumes of raw fault data to convert the raw data to usable information is a complex, time-consuming task.

SUMMARY OF THE INVENTION

In one aspect of the invention, detecting network failures in a Voice over IP (VoIP) network includes producing failure rate information from VoIP call usage records associated with VoIP call traffic.

Embodiments of the invention may include one or more of the following features.

Detecting network failures in a VoIP network can further include determining, for each time interval, if the failure rate information exceeds a defined threshold and generating an alarm if it is determined that the failure rate information exceeds the defined threshold.

Producing can include examining the VOIP call usage records at given time intervals and producing the failure rate information for each of the given time intervals.

Producing can include extracting information from the VOIP call usage records, generating from the extracted information a list identifying disconnect cause codes for each network element for which such information is collected and associating with each of the disconnect cause codes a count corresponding to a number of occurrences in the VOIP call usage records, and determining, for each network element, a total count corresponding to a total number of the disconnect cause codes and a failure count corresponding to a number of failure type disconnect cause codes included among the identified disconnect cause codes.

The network element can be a VoIP gateway.

The disconnect cause codes can be ISDN disconnect cause codes.

The failure rate information can be produced for each network element. The failure rate information can include a failure rate based on the determined failure count and total count. The failure rate information further can include the failure count.

Determining if the failure rate information exceeds a defined threshold can include determining if the failure rate exceeds a predetermined failure rate threshold and the failure count exceeds a predetermined failure count threshold and generating an alarm can include generating an alarm if both of the thresholds are exceeded.

In another aspect of the invention, detecting network failures in a Voice over IP (VoIP) network includes generating alarms from VoIP call usage records.

Particular implementations of the invention may provide one or more of the following advantages. Information gathered in call usage records can be used to provide an operator of a Voice over IP (VoIP) network with improved real-time information about potential and/or actual network failures. Such real-time reporting allows for better monitoring and problem tracking, particularly useful for large Voice over IP networks. Moreover, problems that are specific to particular VoIP network elements such as gateways can be identified in near real-time.

Other features and advantages of the invention will be apparent from the following detailed description and from the claims.

BRIEF DESCRIPTION OF THE DRAWINGS

FIG. 5 is an exemplary alarm output, in particular, a display of disconnect failure data processed according to the alarm generation tool of FIG. 4.

DETAILED DESCRIPTION

Figure 1:
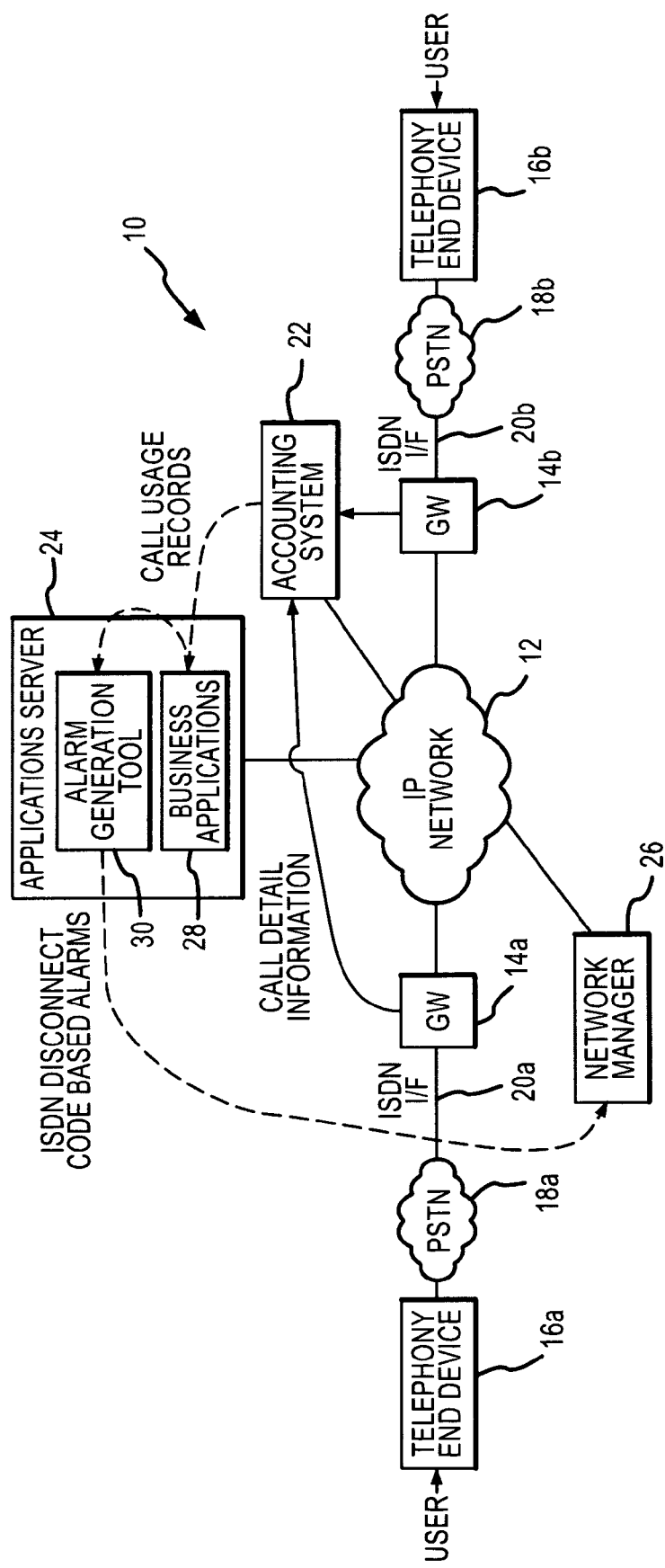
FIG. 1 is a block diagram of a telecommunications network that includes a Voice over IP (VoIP) network and employs an accounting system and an alarm generation tool for fault management.

FIG. 1 is a block diagram of a telecommunications network 10. Telecommunications network 10 includes a packet-based network 12 shown as an Internet Protocol (IP) network 12. The IP network can be a public IP network, e.g., the Internet, or a private IP network. Connected to the IP network 12 are gateways 14, including a first gateway 14a and a second gateway 14b. Also included in the network 10 are telephony end devices 16a and 16b, for example, Plain Old Telephone Service (POTS) telephones, which are connected to the gateways 14a and 14b through respective telephony networks 18a and 18b. The telephony network 18 can be, for example, a Public Switched Telephone Network (PSTN), as shown in the figure. The gateways 14 provide translation services between protocols of the IP network 12 and the telephony network 18. The telephony network 18a is connected to the gateway 14a by a first telephony transmission line, shown as an ISDN line 20a, e.g., E1, T1, and uses an ISDN Primary Rate Interface (PRI) service. The telephony network 18b is connected to the gateway 14b over a second telephony transmission line 20b, also shown an ISDN line 20b supporting ISDN-PRI service. Other physical and signaling interfaces can be used. For example, the lines 20a, 20b may be ISDN-BRI. Alternatively, the telephony end devices 16a, 16b can be ISDN capable devices that are connected to respective gateways 14a, 14b directly. Because the IP network 12 transports voice traffic, it is referred to as a Voice over IP (VoIP) network and gateways 14 are referred to as VoIP gateways. Although only two gateways are shown, any number of VoIP gateways may be deployed along the border of the VoIP network. In a typical VoIP network operated by a network provider, hundreds of VoIP gateways may be so deployed.

Also included in the network 10 and connected to the IP network 12 is an accounting system 22, an applications server 24 and a network manager 26. The network manager 26 provides administrative support for the network 10. The applications server 24 supports business applications 28, e.g., customer billing, and a fault management application 30 referred to herein as an alarm generation tool 30, as will be described more fully below. The accounting system 22 interfaces with the VoIP network elements such as the gateways 14 that are involved in call establishment and collects from such VoIP network elements information regarding voice calls. The accounting system 22 processes the information, formats the processed information as call-specific usage records and provides those records to the applications server 24 for use by the various business applications 28. The stream of usage records data received by application server 24 from the accounting system 22 is monitored by the alarm generation tool 30 and the usage record data is processed by the alarm generation tool 30 to produce alarms based on the ISDN disconnect cause information contained in those records, as will be described. The alarms are specific to the network elements from which the disconnect cause codes giving rise to the alarms were sourced, e.g., in the network 10 of FIG. 1, gateways 14a, 14b.

In one embodiment, the accounting system 22 is implemented as a computer system configured with the commercially available product known as XACCTusage, from Xacct Technologies of Santa Clara, Calif. For every voice call that transits the VoIP network 12, the accounting system 22, using a product such as XACCTusage, generates a call usage record that is somewhat analogous to the telephone industry's call detail records (CDRs). Unlike the conventional CDRs, however, the call usage records produced by the accounting system 22 can be configured to meet the needs of the individual downstream business applications.

As indicated above, the users, either directly (via end devices 16) or indirectly (via the PSTNS 18), establish and terminate connections with each other and the network 12 using ISDN layer 3 messaging. The ISDN messages used to manage ISDN connections are implemented in accordance with known ITU-T standards, in particular, Q.931. These messages include call establishment messages, such as ALERTING, CALL PROCEEDING, CONNECT and SETUP, and call disestablishment messages, such as DISCONNECT, RELEASE and RELEASE COMPLETE. The ISDN (Q.931) messages are formatted to include several parameters to define the connection and the attributes of the connection. The parameters are examined by the called party (as well as intervening network nodes, such as the gateways 14) to determine the nature of the call. Every Q.931 message exchanged between the users and the network 12 contains the following three parameters: protocol discriminator, call reference and message type. The message type parameter identifies the message function, such as SETUP, DISCONNECT, and so on. Also included in a Q.931 message are Information Element (IE) field(s) residing behind the three mandatory parameters. The IE may include many entries (fields) and its contents depend on the message type.

As already indicated, one message type is DISCONNECT. This message is sent when either party (calling or called) hangs up the telephone (that is, goes "on hook"). It is a trigger to the network that the end-to-end connection is to be cleared. One IE associated with the DISCONNECT message, as well as some other message types, is a cause IE. Currently, ANSI defines 98 cause codes and the ITU-T defines 51 cause codes. A partial listing of the ITU-T cause codes is given in TABLE 1 below.

TABLE 1

| Cause No. | ISDN Close Description |
| --- | --- |
| 1 | Unallocated (unassigned number) |
| 2 | No route to specified transit network |
| 6 | Channel unacceptable |
| 16 | Normal call clearing |
| 17 | User busy |
| 21 | Call rejected |
| 41 | Temporary failure |
| 49 | Quality of service unavailable |
| 127 | Interworking, unspecified |

The cause IE consists of two to three significant bytes. A single general location byte indicates where the disconnection message was generated (e.g., remote user, public network serving local user, transit network), the actual cause value provides a description in varying detail and a diagnostics byte may be added providing further information. It should be noted that cause codes can be implementation specific. For example, some telephony equipment manufacturers use a much smaller sub-set of codes, covering a wide range of possible problems.

Figure 2:
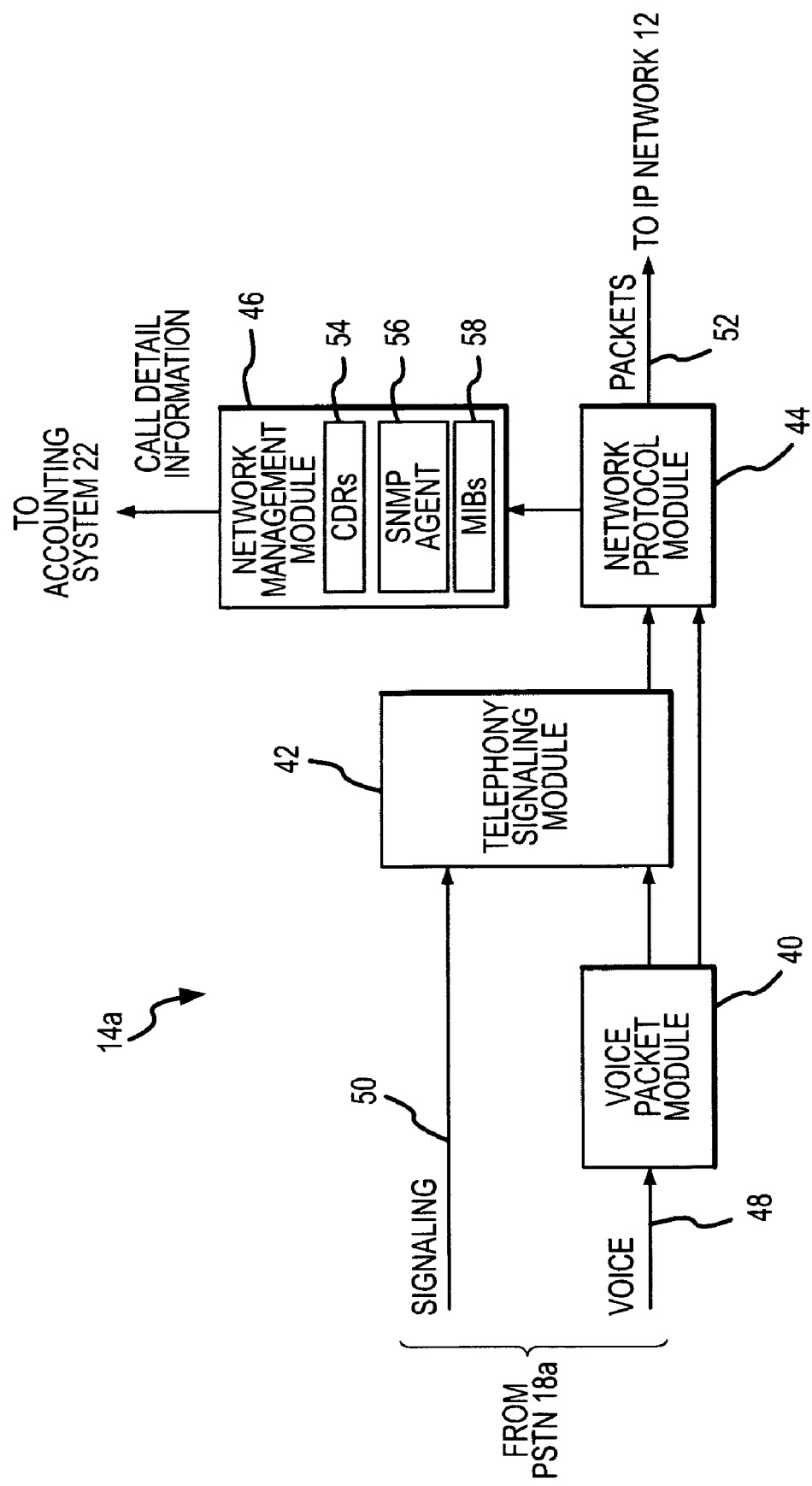
FIG. 2 is a block diagram of an exemplary gateway in the VoIP network (of FIG. 1).

Referring to FIG. 2, each of the gateways 14 (represented in the figure by the gateway 14a) includes the necessary hardware and software to enable it to establish (in conjunction with another gateway, if necessary), and terminate a requested connection between the end stations 16 (of FIG. 1). Typically, the gateway 14a includes a voice packet module 40, a telephony-signaling module 42, a network protocol module 44 and a network management module 46. The voice packet module 40 receives voice sample information over a voice sample input 48, processes that information (for example, using voice codecs to compress the voice information) and encapsulates the processed information into a packet for transmission over the IP network 12. The telephony signaling module 42 detects call control/status information via ISDN messages received on an ISDN signaling input 50 and collects destination address information needed to route that call to its intended destination. The network protocol module 44, which implements a VoIP protocol stack, e.g., H.323, receives the packets from the voice packet module 40 and signaling output from the signaling module 42. In response, it establishes the call and connection, and transmits the packets over a transmission line 52 connected to the IP network 12.

While a call is ongoing, various types of information pertaining to the call are collected and maintained within the network management module 46. The information includes time of call, caller (customer or subscriber number), address digits dialed by the caller, information used to complete the call, call setup and termination parameters (such as the ISDN message parameters discussed above) and other types of call information. The manner in which the gateway 14 collects (or produces) and stores such information in the network management module 46 is well known in the art. The information can include unformatted raw information as well as formatted information. Formatted information can include conventional call detail records (CDRs) 54, an SNMP agent 56 and management information bases (MIBs) 58 supporting both telephone and network protocol functions.

The accounting system 22 receives the call detail information collected and maintained by a gateway, such as the gateway 14a, from that gateway's network management module 46. The accounting system 22 processes the call detail information for a given call to produce a usage record for that call. During a call, the accounting system receives periodic updated call details.

Because of the nature of Internet telephony and Internet communication in general, the information packets transmitting the call also carry information about the call. This information can be readily extracted from the packets and used to provide continuously updated, real-time information. This information can include, for example, the packet path, the duration of the call which may be continuously updated, if desired, the packet density or the packets per unit time used for the call, available voice enhancements or alterations, if used. Thus, a network operator is able to gather and process information about Internet telephony calls.

When a call is initiated, the call setup information is received by the accounting system 22 from the gateway's network management module 46. This call setup information preferably includes the origin and destination of the call, the billing choices made, such as originator billing, collect or third-party billing, or other options, and selected enhancements. The accounting process identifies the customer (user) account and services, as well as ISPs, by querying its internal databases. It receives notification of the end of the call. The accounting system 22 creates and logs a detail of the call, that is, the call usage record discussed above.

Figure 3:
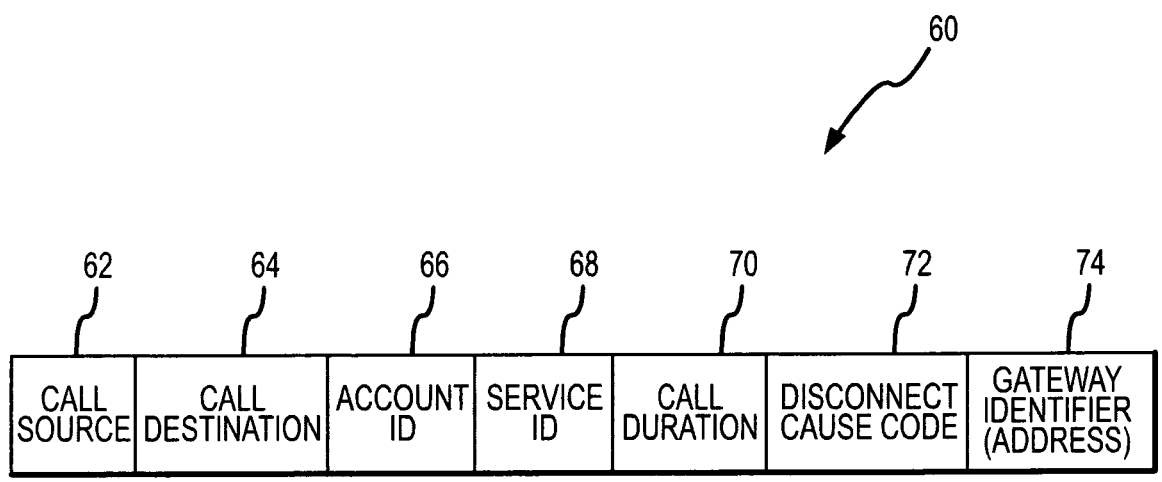
FIG. 3 is an illustration of an exemplary format of a voice call usage record produced by the accounting system and used by the alarm generation tool of FIG. 1.

Referring to FIG. 3, an exemplary call usage record 60 for voice calls generated by the accounting system 22 from network elements such as gateways 14 in the VoIP network 10 may be formatted to include the following: a call source 62 and call destination 64, account identification 66, service identification 68 and call duration 70. Also detailed in the record 60 and of particular interest is the manner in which the call to which the usage record 60 corresponds is terminated. The usage record 60 provides this information in the form of a disconnect cause code 72, which corresponds to the ISDN disconnect cause codes described earlier. The call disconnect code 72 can be indicated by a "success" disconnect cause code for calls terminated for reasons unrelated to problems or failure conditions, e.g., call completion, or a "failure" disconnect cause code selected from among a plurality of unique failure codes for calls disconnected as a result of a network or network device problem. With reference to Table 1 above, examples of success disconnect cause codes would include cause code numbers 16 and 17, and examples of failure disconnect cause codes would include cause code numbers 1, 2, 6, 41, 49 and 127. The usage record 30 also includes a gateway identifier field 74 for identifying address or ID of the gateway from which the call information contained in the usage record was sourced. Other fields can be included in the usage record 60 as well. For example, the call usage record 60 could be defined to include call start time, originating and terminating gateways, voice enhancements, as well as packed based information like call routing and packet density.

Figure 4:
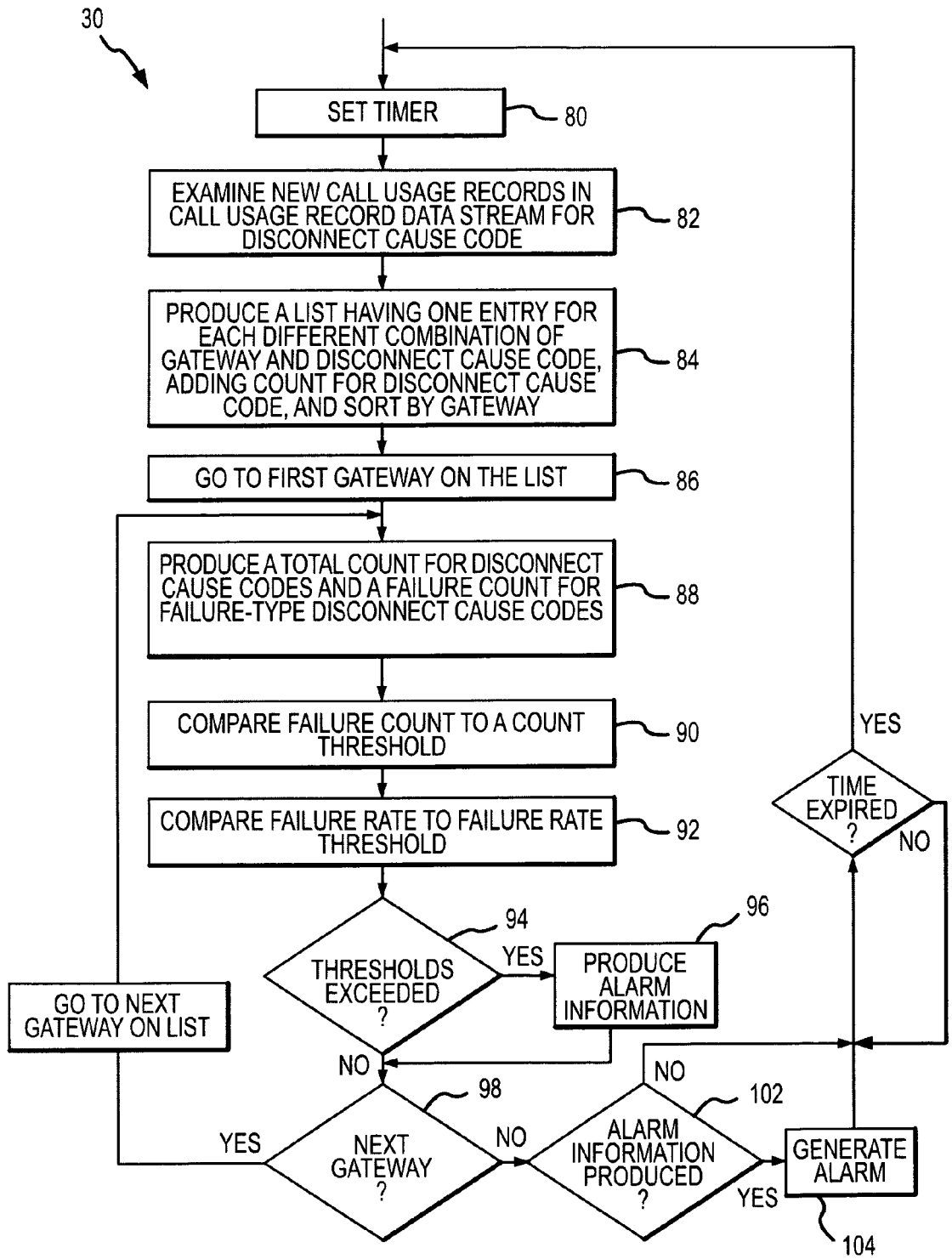
FIG. 4 is a flow diagram illustrating an exemplary method of the operation of the alarm generation tool (shown in FIG. 1), which produces alarms based on gateway-specific ISDN disconnect cause information.

Referring to FIG. 4, the alarm generation tool or process 30 operates as follows. The process 30 begins by setting a timer (step 80) to control the frequency with which the process repeats. The process 30 analyzes any new usage records in the usage record data stream (that is, usage records received thus far, or, if the process 30 is repeating, any usage records received and not yet processed) to detect disconnect cause codes (step 82). The process 30 extracts from the usage record data stream disconnect information for the detected disconnect cause codes, on a per/gateway basis (step 84) to generate a list. The list entries include the following information: gateway ID; disconnect cause code; count; and usage record filename. Each entry corresponds to a different combination of gateway ID and disconnect cause code number, and an appropriate count corresponding to the number of occurrences of that disconnect cause code. Preferably, the list is sorted by gateway. Once the list has been generated and sorted, the process 50 examines the entries belonging to the first gateway on the list (step 86). For that gateway, the process 30 determines a total count of all disconnect cause codes and a failure count corresponding to the total number of failure type disconnect cause codes (step 88). The process 30 compares the failure count to a count threshold (step 90). The process 30 also compares a failure rate determined from the total and failure counts (that is, the percentage of the total number of disconnect cause codes that are failure-type disconnect cause codes) to a failure rate threshold (step 92). Preferably, a single threshold is set for all failure type disconnect cause codes. Alternatively, the threshold comparison could be made for one or more specific types of failure disconnect cause codes. The process determines if the results of the two comparisons indicate that the two thresholds were exceeded (step 94). If so, the process 30 produces alarm information, that is, it stores or logs information about the failures, more specifically, the gateway ID along with its associated failure rate and count (step 96). After the failure information is saved, or otherwise, if the thresholds have not been exceeded, the process 30 determines if there is another gateway represented in the list (step 98). If so, the process 30 proceeds to examine entries for the next gateway (step 100) and returns to step 88. If there are no other list entries to be examined, then the process 30 determines if any alarm information was produced (step 102). If it is determined that alarm information was produced, the process 30 generates an alarm based on the generated alarm information and, preferably, the list entries, via a communications mechanism, e.g., a page, an electronic mail, or a printed report (step 104). Once any alarm generation activity that is to occur has been triggered, the process 30 waits for the timer to expire (step 106). When the timer has expired, the process repeats at step 80.

Although the process 30 is describes as producing alarm information only when both of the thresholds have been exceeded, it will be appreciated that the process could be modified to require that only one of the two thresholds be exceeded for alarm generation. In yet another alternative implementation, only one threshold could be used.

Thus, the alarm generation tool 30 executes at fixed intervals, e.g., every 30 minutes, and examines the usage record data stream generated since the last run. It will be apparent that the timer parameter can be programmed or dynamically adjusted to allow the tool to be run in other than half hour increments as the application requires.

Referring to FIG. 5, an example of a textual format for reporting/displaying an alarm output 110 is illustrated. The display 110 is formatted to include a notification portion 112. Coupled to the notification portion 112 are a summary 114 and a detailed report 116. The summary 114 identifies each gateway having a recorded number of failure-type disconnect cause codes in excess of the defined thresholds. The detailed report 116 provides, for each gateway identified in the summary 114, a detailed breakout of all disconnect cause codes by number and associated count, as well as the date on which the data was processed. The information in the detailed report is readily obtained from the list generated during the process 30 described earlier with reference to FIG. 4. The textual display of FIG. 5 is merely illustrative and not exhaustive of the types of display formats that can be generated from the data. Other representations of data are possible. In addition, other types of information conveyance are possible. For example, the information may be reported via a text-to-speech interface.

Preferably, the alarm is sent to the network manager 26 (from FIG. 1). Thus, the alarm output (as illustrated in FIG. 5) allows a network operator to monitor, via the network manager 26, in real time, or substantially real time, the operation of the network 10 as it relates to the voice calls transported by the VoIP network 12. Through the alarms, the network operator has the ability to obtain an ongoing picture of the call failure disconnect statistics relating to particular gateways. For example, the network operator can see in real time how many calls are being attempted minute by minute, how many calls are being allowed through the network, how many calls are incompletes, how many calls are blocked, etc., on a per-gateway basis. This ability to monitor the operation of the network gives the network operator the ability to determine in real-time the specific actions that need to be taken. For instance, if there is an abnormal number of disconnected calls for a particular gateway during a given period, the network operator can make appropriate routing configuration adjustments, that is, control the network manager to restructure the network so as to reroute the calls to different gateways where they may be better handled.

Other additions, subtractions, and modifications of the described embodiments of the invention will be apparent to those practiced in this field and are within the scope of the following claims. For example, the process and network topology can be adapted to accommodate other different physical and signaling protocols employing disconnect cause codes. Thus, although the disconnect cause codes are described as ISDN disconnect cause codes, the alarm generation process could work equally well with the same or similar information (information indicative of call disconnects) based on another protocol's messaging. Also, the process could be modified to utilize other types of cause codes or information contained in the usage records. While, in the disclosed embodiment, an IP network is selected as network 10, it should be clearly understood that the invention is equally suitable for use with other types of data networks, for example, a Voice Over Frame Relay or Voice Over ATM network, and the interfaces and protocols could be modified accordingly.

The invention claimed is:

1. A method of detecting network failures in a Voice over IP (VoIP) network, the method comprising:
   receiving VoIP call usage records for VoIP call traffic passing through the VoIP network during a particular time period, wherein each of the VoIP call usage records identifies a disconnect cause code and one of a plurality of network elements responsible for reporting the disconnect cause code;
   generating a list of each of the plurality of network elements identified by the VoIP call usage records;
   determining for each of the plurality of network elements:
      a number of instances of each disconnect cause code identified by the VoIP call usage records,
      a number of instances of failure-type disconnect cause codes identified by the VoIP call usage records, a sum of the number of instances of each disconnect cause code, and a failure rate by dividing the number of instances of failure-type disconnect cause codes by the sum of the number of instances of each disconnect cause code;
   comparing for each of the plurality of network elements:
      the number of instances of failure-type disconnect cause codes with a first predetermined threshold, and
      the failure rate with a second predetermined threshold; and
   producing alarm information for each of the plurality of network elements for which the number of instances of failure-type disconnect cause codes exceeds the first predetermined threshold or for which the failure rate exceeds the second predetermined threshold.

2. The method of claim 1, further comprising:
   producing alarm information for each of the plurality of network elements for which the number of instances of failure-type disconnect cause codes exceeds the first predetermined threshold and for which the failure rate exceeds the second predetermined threshold.

3. The method of claim 1, wherein the plurality of network elements is a plurality of gateways.

4. The method of claim 1, wherein at least one of the plurality of network elements is a VoIP gateway.

5. The method of claim 1, wherein the method of claim 1 is repeated for VoIP call usage records for VoIP call traffic passing through the VoIP network during a successive time period equal in length to the particular time period.

6. The method of claim 1, further comprising generating an alarm based on the production of alarm information.

7. The method of claim 6, wherein the alarm indicates each of the plurality of network elements for which alarm information has been produced.

8. The method of claim 7, wherein the alarm further indicates the failure rate and the number of instances of failure-type disconnect cause codes for each of the plurality of network elements for which alarm information has been produced.

9. The method of claim 8, wherein the alarm further indicates the number of instances of each disconnect cause code for each of the plurality of network elements for which alarm information has been produced.

10. The method of claim 6, wherein the alarm is one or more communications mechanisms selected from the group consisting of: an audible sound, an electronic report, an e-mail, a printed report, and a page.

11. The method of claim 1, wherein the disconnect cause codes are ISDN disconnect cause codes.

12. The method of claim 1, further comprising:
   sending the alarm information to a network operator to permit the network operator to obtain an ongoing, substantially real time picture of the failure rate and the number of instances of failure-type disconnect cause codes relating to particular network elements of the plurality of network elements.

* * * * *